United States Patent [19]

Kawano

[11] Patent Number: 4,714,093

[45] Date of Patent: Dec. 22, 1987

[54] BLADDER TYPE FLUID ACCUMULATOR FOR HYDRAULIC SYSTEM

[75] Inventor: Hiroshige Kawano, Amagasaki, Japan

[73] Assignee: Nakamura Koki Co., Ltd., Hyogo, Japan

[21] Appl. No.: 891,966

[22] Filed: Aug. 1, 1986

[30] Foreign Application Priority Data

Aug. 3, 1985 [JP] Japan .............................. 60-171356

[51] Int. Cl.[4] .............................................. F16L 55/04

[52] U.S. Cl. ..................................... 138/30; 200/83 L

[58] Field of Search ................. 92/92; 138/26, 30, 31; 200/83 R, 83 B, 83 J, 83 L, 83 N, 83 W

[56] References Cited

U.S. PATENT DOCUMENTS

| | | | |
|---|---|---|---|
| 2,444,352 | 6/1948 | Hoffman et al. | 200/83 L |
| 3,206,572 | 9/1965 | Buehler | 200/83 L |
| 3,654,956 | 4/1972 | Tsubouchi | 138/30 X |
| 3,741,692 | 6/1973 | Rupp | 138/30 X |
| 3,859,619 | 1/1975 | Ishihara et al. | 200/83 L X |
| 4,014,213 | 3/1977 | Parquet | 138/30 X |
| 4,107,494 | 8/1978 | Tuegel | 200/83 L |
| 4,487,226 | 12/1984 | Chun | 138/30 |

FOREIGN PATENT DOCUMENTS

| | | | |
|---|---|---|---|
| 39-8340 | 5/1964 | Japan . | |
| 41-7219 | 4/1966 | Japan . | |
| 49-22571 | 6/1974 | Japan . | |
| 1139162 | 1/1969 | United Kingdom | 200/83 L |

*Primary Examiner*—Charles E. Phillips
*Assistant Examiner*—Mark J. Thronson
*Attorney, Agent, or Firm*—Lowe, Price, LeBlanc, Becker & Shur

[57] ABSTRACT

A gas-pressurized collapsible bladder inside a fluid accumulator in a hydraulic system has a detection device that informs a user about the state of inflation of the bladder. Abnormalities in system operation, e.g., a gas leak from the collapsible bladder or sudden turning on of the fluid-actuated device in the system can cause bladder deflation whereas clogging of lines or sudden stoppage of a fluid-actuated device may cause fluid pressure rise in the system, and hence, deflation of the collapsible bladder to actuate the detection device. In one aspect of the invention, the condition of the bladder is detected by use of a permanent magnet that actuates a reed relay. In another aspect of the invention, a light-emitting diode, a reflector and a photosensor detect the bladder condition.

13 Claims, 6 Drawing Figures

BLADDER TYPE FLUID ACCUMULATOR FOR HYDRAULIC SYSTEM

FIELD OF THE INVENTION

This invention relates to a fluid accumulator in a hydraulic system, with the facility for providing information on the state of a collapsible bladder incorporated therein. More particularly, this invention concerns a bladder-type accumulator which permits a user to detect the inflation and deflation of a bladder therein caused by temporary accumulation or discharging of oil contained in the hydraulic system.

BACKGROUND OF THE INVENTION

A fluid accumulator is typically used in a hydraulic system for preventing the pressure of oil, the fluid, e.g., from rising excessively or suddenly falling due to temporary accumulation or discharging of oil contained in the hydraulic system. For example, the accumulator temporarily accumulates oil fed from a pump while a fluid-actuated device such as a hydraulic motor is turned off. The accumulator, when the device is actuated, discharges accumulated oil and feeds it to the device until more oil from the pump reaches the device.

The accumulator, as described above, usually comprises a cylindrical shell and a gas-filled rubber bladder incorporated therein, and the bladder is precharged with nitrogen gas under high pressure, for example, 2,900 lbf/in$^2$ or 203.9 c kg/cm$^2$. When the hydraulic system is pressurized to, for example, 5,000 lbs/in$^2$ or 351.53 kg/cm$^2$, the oil flows into the space between the shell and the bladder. The bladder is thereby deflated and internal pressure thereof rises. Oil continues to flow into the accumulator until the pressure in the bladder rises to 5,000 lbs/in$^2$, at which time oil in volume equal to the reduction in volume of the bladder is accumulated. Contrarily, when oil in the accumulator is completely discharged therefrom, the pressure in the bladder decreases till 2,900 lbs/in$^2$ and the bladder is restored to its initial shape.

Circumstances, such as flowing of oil into the accumulator when the fluid-actuated device is not operating, may be caused by various failures, e.g., clogging of the piping, leakage of gas from the bladder, and, as an extreme example, non-precharging of gas under predetermined pressure in the bladder. On the other hand, during the period that oil must be accumulated, accident interruption of the flow of oil into the accumulator may occur, e.g., due to oil leakage from the piping or due to trouble in any valve provided in the piping.

At present, however such accumulators are not available with a device for detecting inflation and deflation of the bladder and, therefore, troubles in fluid-actuated devices or piping in the hydraulic system can not be detected by reliance on an abnormal behavior of the bladder. For instance, trouble may not be found until the device works beyond a desired range or a quantity of oil has leaked out. The trouble, if not found at an early stage, develops further, and much time and labor may be required for repairing the system.

SUMMARY OF THE INVENTION

An object of this invention is to enable detection of the behavior of a collapsible bladder incorporated in a fluid accumulator so that problems in fluid-activated devices, piping, valves or the accumulator in a hydraulic system may be detected. Promptly in response to signals indicating inflation or deflation of the bladder.

This object is achieved by providing with: in a bladder-type fluid accumulator for a hydraulic system a containment means, a collapsible bladder capable of internal pressurization located within the containment means so that the hydraulic fluid occupies a space between the bladder and inside of the containment means wall with the collapsible bladder wall moving as the fluid enters or leaves this space, and a bladder condition detecting means inside the bladder actuated by movement of the collapsible bladder walls. The detecting means in a preferred embodiment include a tube, a slider moving along the tube and switch means for detecting movement of the slider. In one aspect of the invention the slider carries a permanent magnet and this actuates a conventional reed switch. In another aspect of the invention the slider moves a reflecting element and the switch means includes a source of light and a photosensor to receive the light reflected back from the moving slider to actuate a switch.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
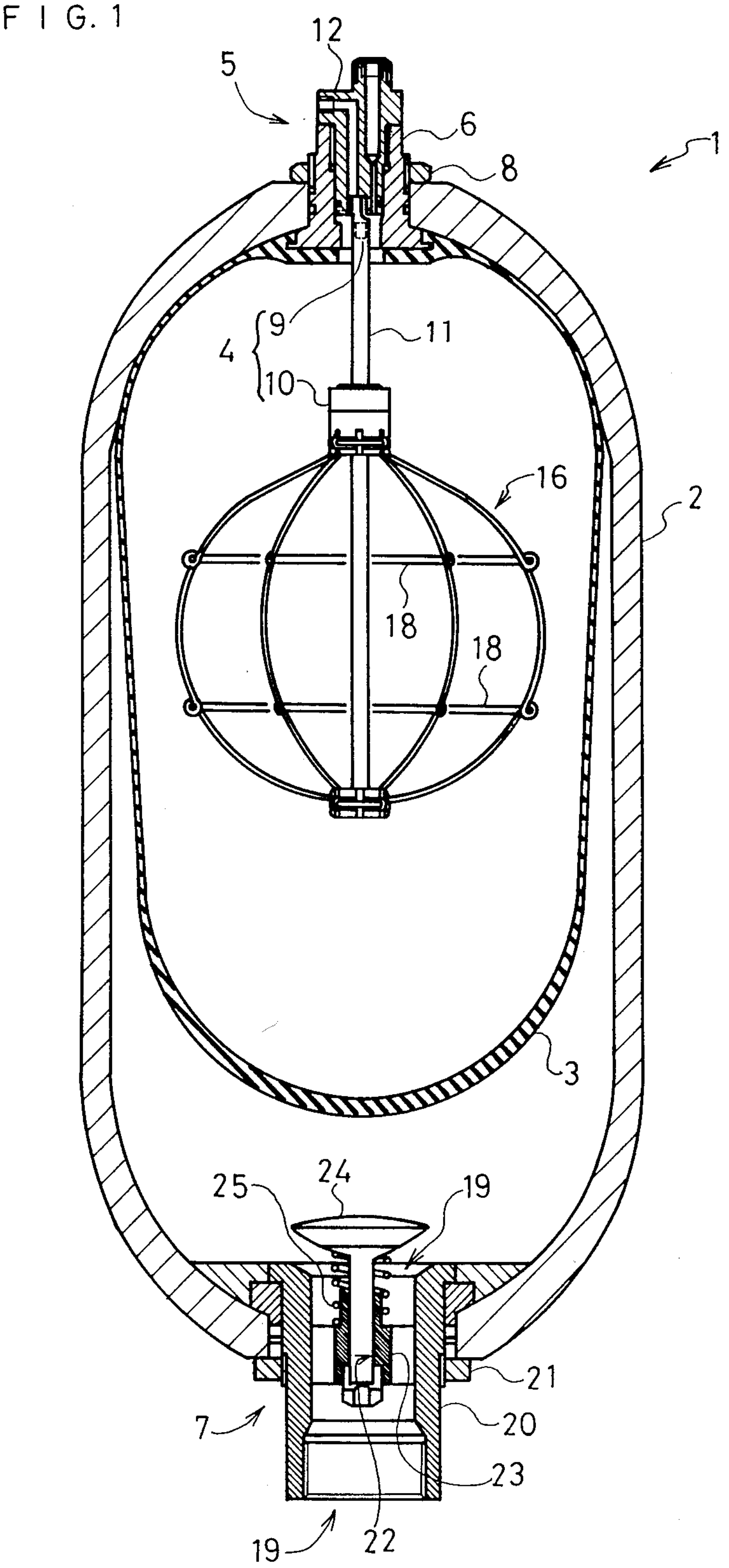
FIG. 1 is a sectional view of an accumulator according to this invention provided with a device for detecting the behavior of a bladder.

Referring to FIG. 1, an accumulator 1 is composed of a shell 2, a bladder 3 incorporated in the shell 2 and a detecting device 4 internally fixed thereto. The shell 2 is cylindrical at a trunk part and hemispherical at its top and bottom parts. The rubber bladder 3 is precharged with, for example, nitrogen gas, is fixed to the inside of upper end 5 of the shell 2. The bladder 3 having a metal piece 6 fixed thereto is inserted into the shell 2 through an opening formed on the lower end 7 of the shell 2 and is fixed to the upper part of the shell 2 with a nut 8. The bladder 3 is respectively inflated or deflated by oil flowing from the hydraulic system into accumulator 1 or flowing out therefrom. A tube 11 supporting a detecting device 4, comprising detecting switch means 9 and a slider 10, is mounted on the metal piece 6. To the upper part of the metal piece 6, is affixed a metal piece 12 providing an opening for gas to be precharged into the bladder 3 and another opening for wiring.

Figure 2:
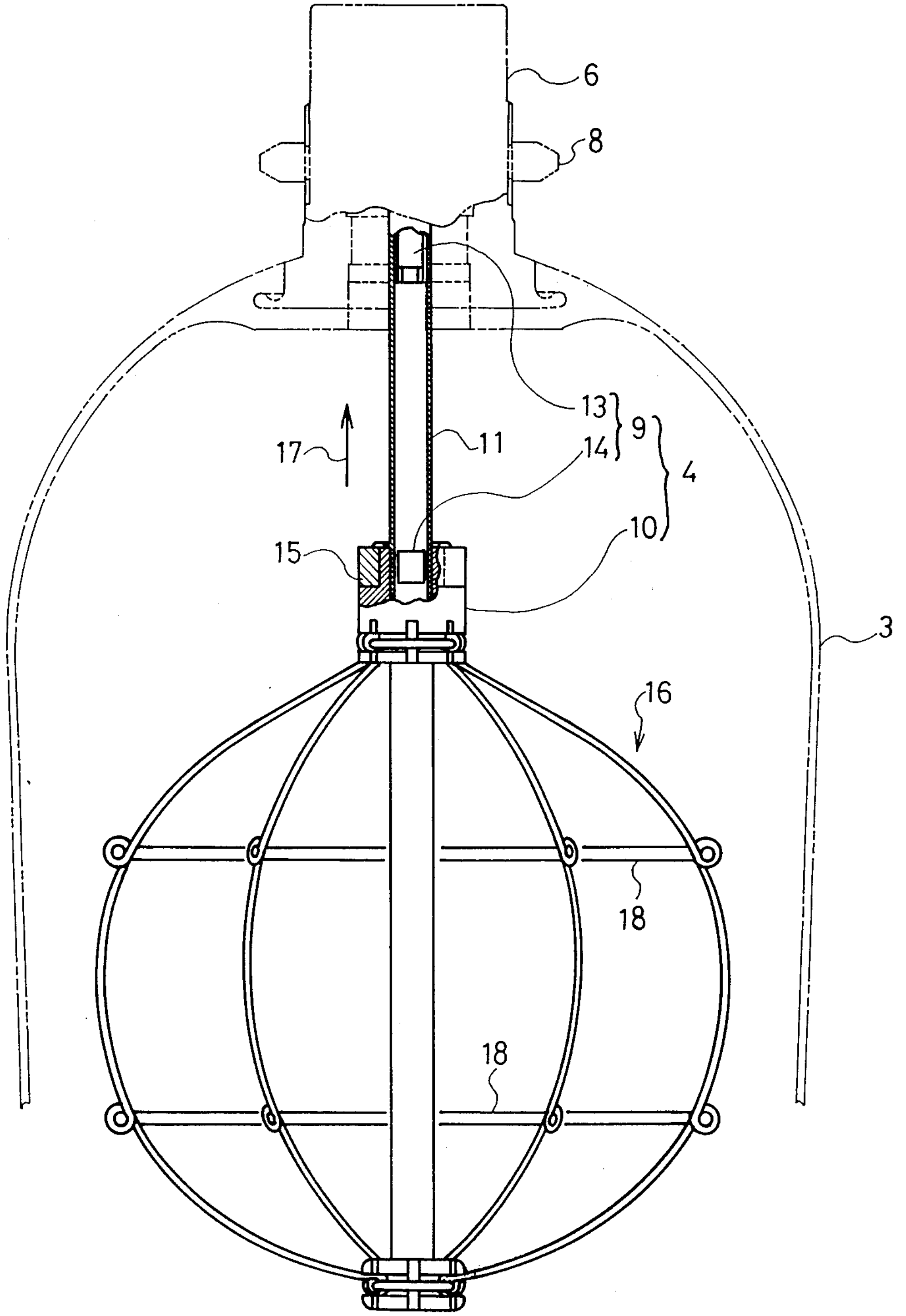
FIG. 2 is an enlarged view of a detecting device provided with a photosensor.

With reference to FIG. 2, the tube 11 is disposed on the center line of the bladder 3, incorporates a photo sensor 13 and light reflector 14 therein, and guides a slider 10 to slide on and along the outer surface of the tube 11. The photo sensor 13 emits ON signals under a deflated condition of the bladder 3 and includes a light emitting diode (LED) and a photo diode sensitive to reflecting light. The slider 10 is provided with an annular magnet 15 which moves the light reflector 14 in the tube 11 according to the behavior of the bladder 3 so as to change the distance between the light reflector 14 and LED.

Upon deflation of the bladder 3, expander means 16, composed of several lines of steel wires and controlling the position of the slider 10 is pressed by the inner surface of the bladder 3, whereby the slider 10 is caused to slide toward the arrow direction 17. Displacement of the slider 10 varies in correspondence to the degree of deflation of the bladder 3, and the rate of light reflection varies in relation to displacement of the light reflector 14 sliding with the slider 10, whereby signals having intensity corresponding to the degree of deformation of the bladder 3 are emitted. By displacing the photo sensor 13 in the tube 11, the level of received signals can be changed and faint signals can be cut.

The steel wires of expander means 16 and kept apart at equal intervals by means of rubber bands 18 and are restored to the initial state when the bladder 3 is inflated.

Referring to FIG. 1 again, a metal piece 20 having an oil port 19 formed therein is unmovably fixed to the lower end 7 of the shell 2 with a nut 21 and is connected to the piping of the hydraulic system. The metal piece 20 is also provided with a small cylinder 23 having a port 22. A poppet valve 24 is guided by the cylinder 23 and subjected to upwardly acting force by a spring 25. The oil port 19 is opened when the poppet valve 24 is subjected to pressure higher than that inside the bladder 3.

Figure 3:
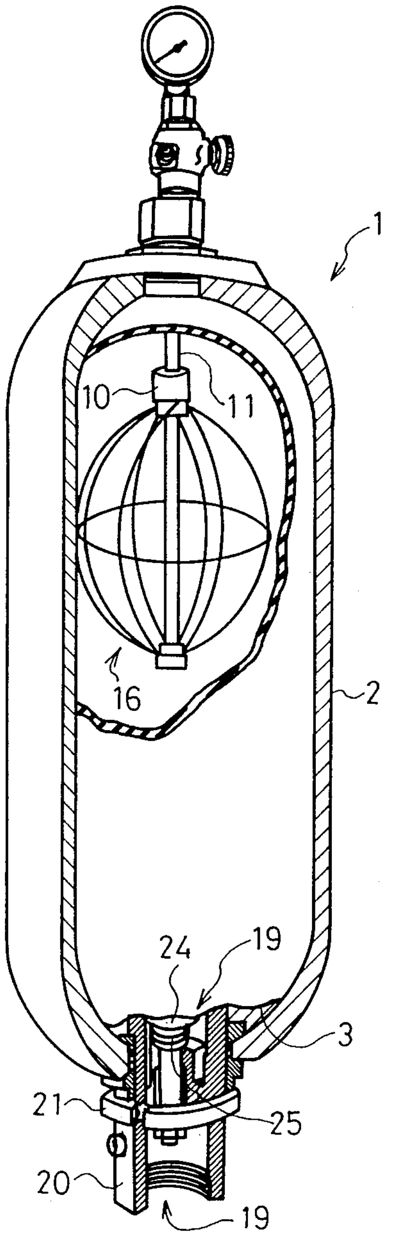
FIG. 3 is a partially sectioned perspective view of the accumulator with the bladder in its inflated state.

Nitrogen gas or argon gas is precharged into the bladder 3 through the metal piece 6 to a high pressure e.g., 2,900 lbs/in$^2$, therein. As shown in FIG. 3, the bladder 3 is inflated and the outer surface thereof comes into contact with the inner surface of the shell 2 whereas the lower surface of the bladder pushes on the poppet valve 24. The poppet valve 24 descends in opposition to the biasing force of a spring 25 and shuts the oil port 19.

The light emitting diode of the photo sensor 13 in the tube 11 emits light, but reflected light does not reach the photo diode because of a long distance from the LED and diffusion as well as attenuation of light itself, whereby corresponding OFF signals are emitted.

When the fluid-actuated device, e.g., a motor, is inoperative or clogging occurs in the piping, pressure higher than that in the bladder 3 acts upon the oil port 19. The poppet valve 24 ascends and oil flows from the oil port 19 into the space between the shell 2 and the bladder 3, thereby deflating the bladder 3.

Figure 4:
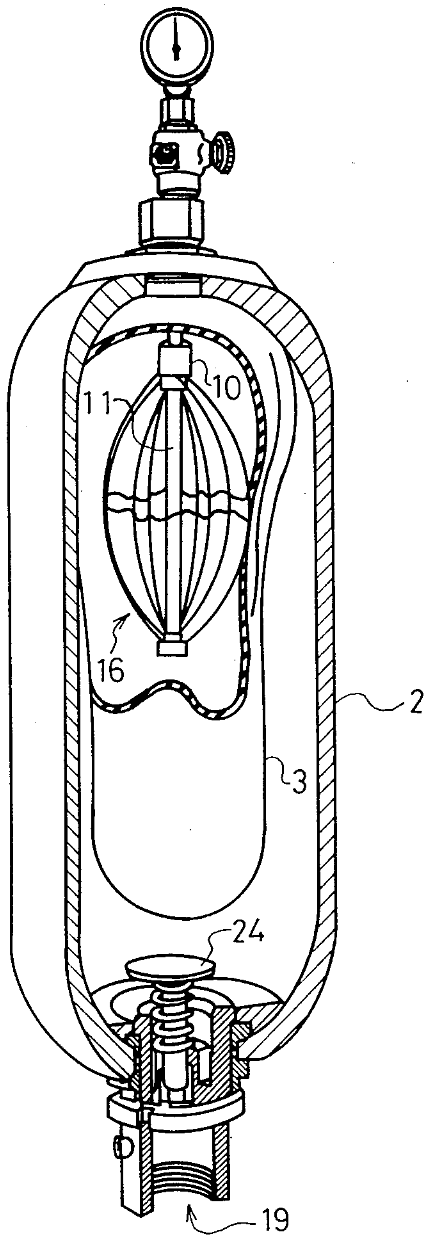
FIGS. 4 and 5 are similar to FIG. 3 illustrating the bladder in successively more deflated states; and, FIG. 6 is an enlarged view of a detecting device provided with a reed relay.
Figure 5:
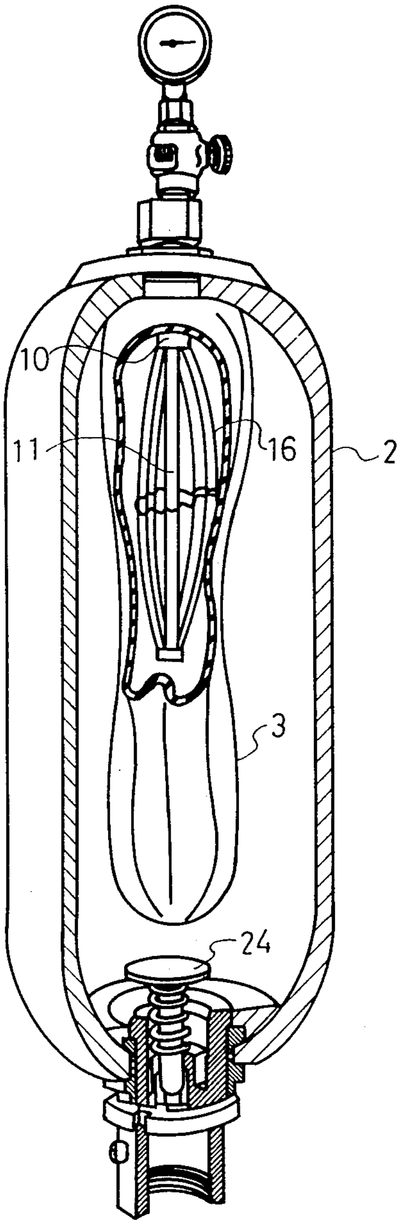

When the bladder 3 is deflated as shown in FIG. 4, the inner surface of the bladder 3 deforms expander means 16 and the slider 10 rises upward. Light emitted from the LED is reflected by the light reflector 14 that has come close to the photo sensor 13 and the photo diode emits ON signals while sensing reflected light. With a large increase in the degree of deflation of the bladder 3, as illustrated in FIG. 5, the light reflector 14 is further displaced and this increases the intensity of ON signals. When the fluid-actuated device is released to operate, oil flows out therefrom and the bladder 3 is inflated, whereby deformed expander means 16 is restored to the initial shape. The slider 10 returns to the initial position and the light reflector 14 recedes from the LED, hence the signals change into OFF. Accordingly, the detecting device 4 can detect precisely the behavior of the bladder 3 which changes its shape in response to oil flows into or out from the accumulator 1.

On detecting the behavior of the bladder 3 by means of detecting device 4, such a setting as permitting emission of ON signals with maximum deflation of the bladder 3 or with half deflation thereof is possible. The setting as in the latter case is useful in detecting an insufficient supply of gas, leakage of gas, or injury to the bladder 3. Signals emitted in response to the behavior of the bladder 3, halfway through inflation or deflation, can be used as trigger signals for automatic control over the action of the actuator fluid-actuated device.

Figure 6:
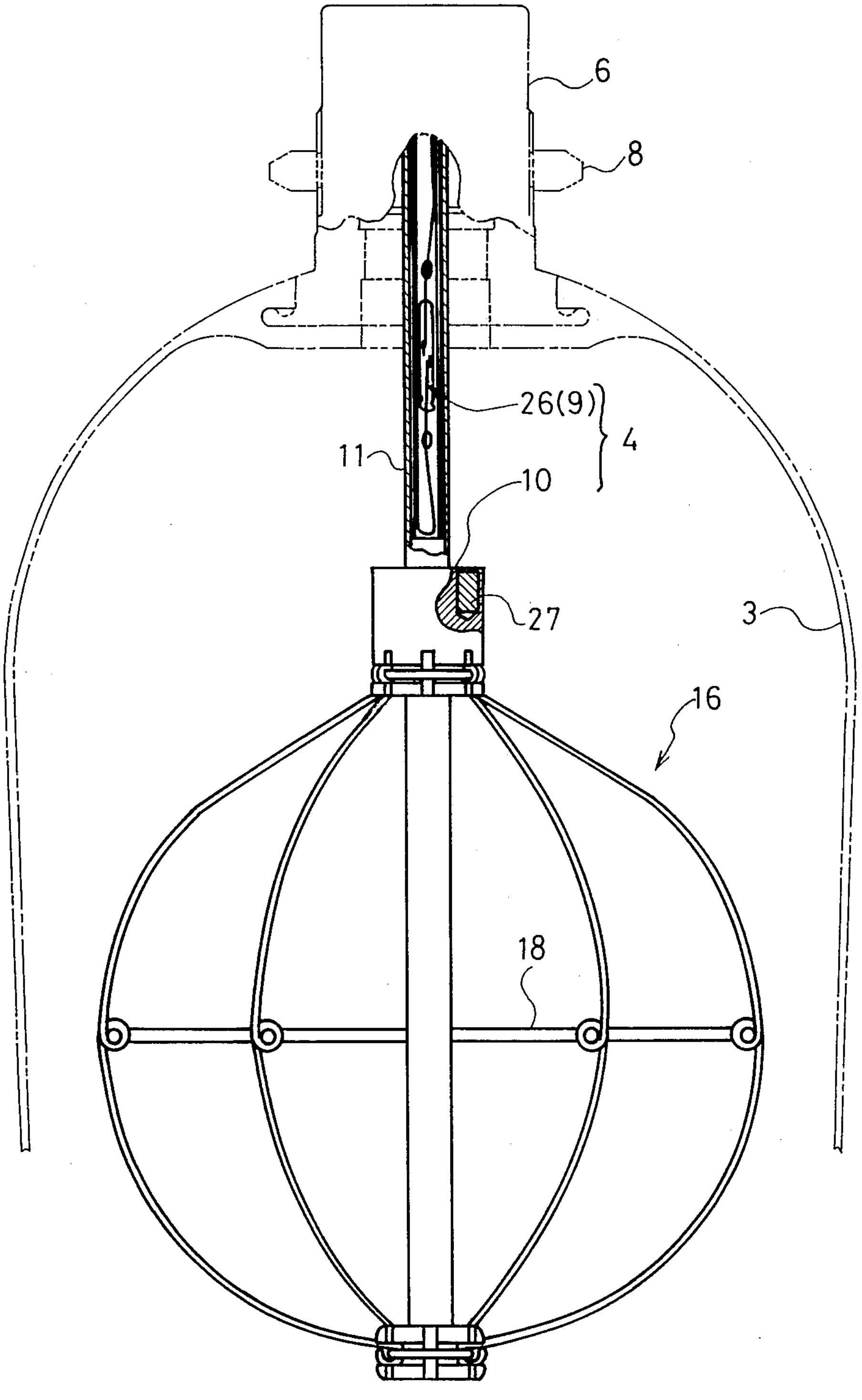

Referring to FIG. 6, detecting switch means 9 includes a reed relay 26 and is incorporated with the necessary wires in the tube 11. The reed relay 26 is electrically changed by a magnet 27 moving with the slider 10. In other words, with deflation of the bladder 3, expander means 16 governing the position of the slider 10 is pressed by the inner surface of the bladder 3 and the slider 10 is thereby moved. The distance by which the slider 10 is displaced depends on the degree of deflation of the bladder 3 and the reed relay 26 is actuated by the magnetic force of magnet 27 brought close thereto. With the reed relay 26 displaced to the appropriate position in the tube 11, ON signals can be emitted in proportion to the degree of deflation of the bladder 3 and the corresponding position of the reed relay.

As can be understood from the above description, when detecting means capable of detecting deflation and inflation of the bladder in the accumulator is provided, the behavior of the bladder can be observed in detail by means of signals emitted therefrom. Prompt recognition of problems in the accumulator and detection of problems, fluid-actuated in the piping device, or valves is possible through observation of the behavior of the bladder. Development of problems is restricted and time and labor for repairs are saved. Output signals from the detecting means can also be utilized for automatic control of a hydraulic system provided with the accumulator as taught herein.

What is claimed is:

1. A bladder-type accumulator for accumulating pressurized hydraulic fluid in a hydraulic system, comprising:

a containment means for accumulating the hydraulic fluid by receiving the same;

a collapsible bladder capable of internal pressurization, disposed within the containment means such that the accumulated fluid occupies space between an outside surface of the bladder wall and an inside surface of the containment means, the wall of said bladder moving in correspondence with a pressure differential across the collapsible bladder wall;

a bladder condition detecting means disposed within the bladder for actuation by movement of the collapsible bladder walls;

the detecting means comprising a tube, a slider moved along the tube in response to movement of the collapsible bladder wall; and, detecting switch means disposed in said tube for detecting movement of said slider with respect thereto.

2. A bladder-type accumulator according to claim 1, wherein:

said detecting means further comprises means for transferring motion of the collapsible bladder wall to the slider.

3. A bladder-type accumulator according to claim 1, wherein:

said slider is provided with magnet means for magnetically actuating said detecting means.

4. A bladder-type accumulator according to claim 1, wherein:

said detecting switch means comprises a light reflector moved within the tube by said slider, and a light source and a photosensor disposed opposite to said light reflector in the tube.

5. A bladder-type accumulator according to claim 1, wherein:

said detecting switch means is a reed relay responsive to the approach of said slider thereto.

6. A bladder-type accumulator, according to claim 1, wherein:

said collapsible bladder is pressurized with nitrogen gas.

7. A bladder-type accumulator, according to claim 6, wherein:

said nitrogen gas is provided to said collapsible bladder at a pressure of approximately 2900 $lbf/in^2$ or 203.9 $Kg/cm^2$.

8. A bladder-type accumulator, according to claim 1, wherein:

said collapsible bladder is formed of a material comprising rubber.

9. A bladder-type accumulator, according to claim 1, further comprising:

poppet valve means for controlling flow of hydraulic fluid into and out of said containment means.

10. A bladder-type accumulator, according to claim 9, wherein:

said collapsible bladder, when inflated by the internal pressure of gas therein, is located so as to contact said poppet valve.

11. A bladder-type accumulator, according to claim 9, wherein:

said collapsible bladder is pressurized with nitrogen gas.

12. A bladder-type accumulator, according to claim 11, wherein:

said nitrogen gas is provided to said collapsible bladder at a pressure of approximately 2900 $lbf/in^2$ or 203.9 $Kg/cm^2$.

13. A bladder-type accumulator, according to claim 12, wherein:

said collapsible bladder, when inflated by the internal pressure of gas therein, is located so as to contact said poppet valve.

* * * * *